Aug. 8, 1939.   N. D. ABBEY   2,168,853
MACHINE FOR CUTTING TUBING
Original Filed Nov. 14, 1936   4 Sheets-Sheet 1
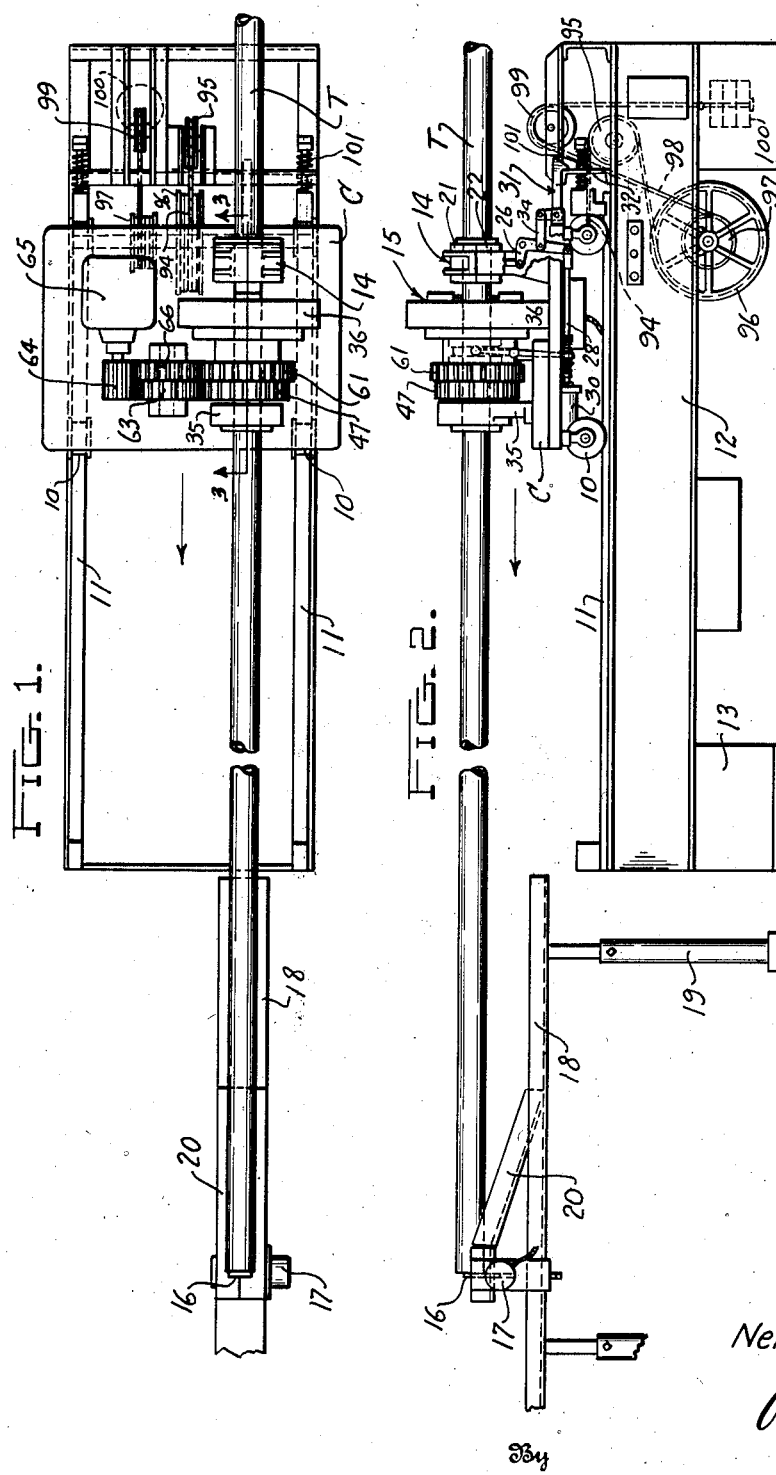
Inventor
Nelson D. Abbey
By Owen & Owen
Attorneys

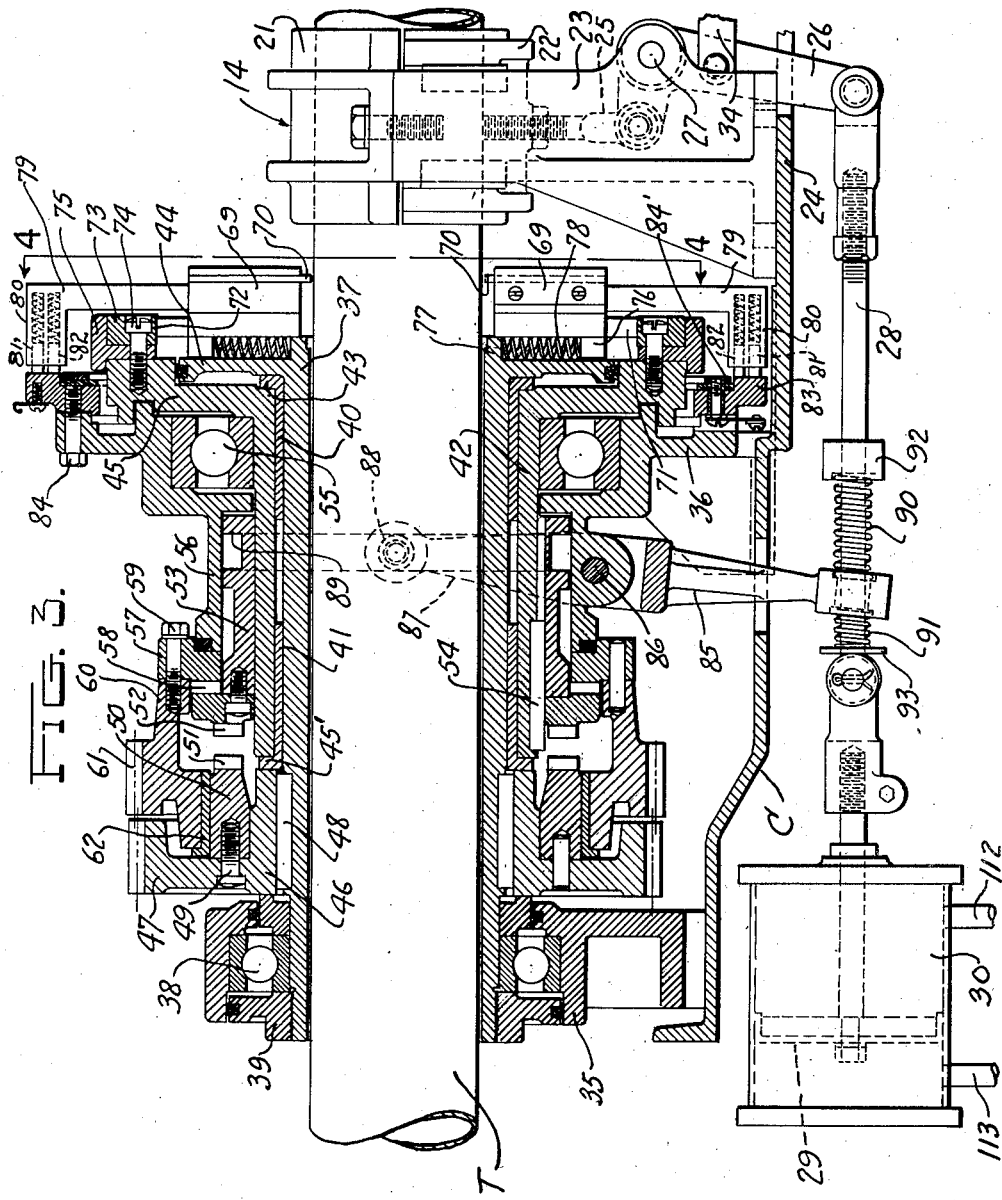

Aug. 8, 1939.    N. D. ABBEY    2,168,853
MACHINE FOR CUTTING TUBING
Original Filed Nov. 14, 1936    4 Sheets-Sheet 3

Inventor
Nelson D. Abbey

By Owen & Owen
Attorneys

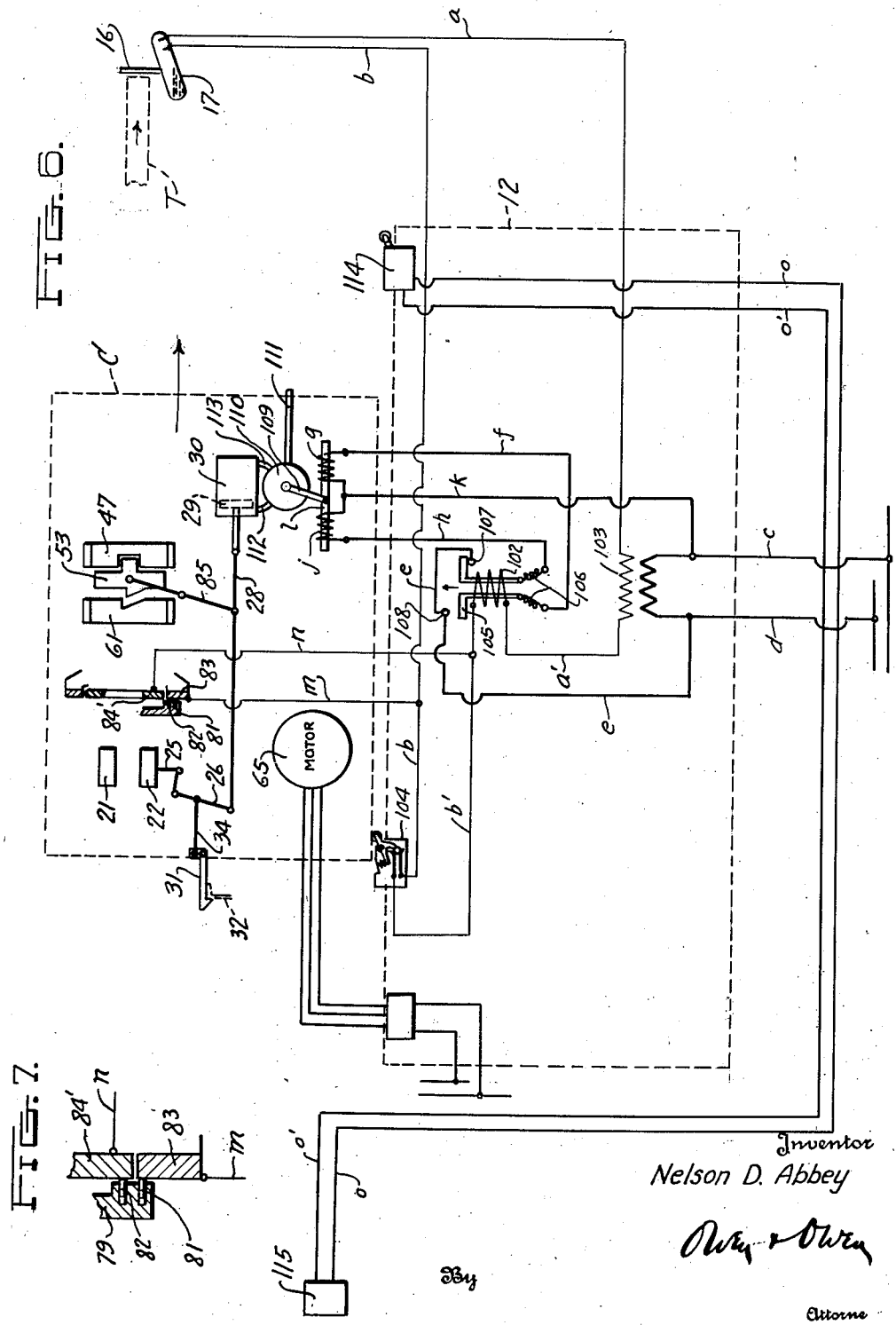

Patented Aug. 8, 1939

2,168,853

UNITED STATES PATENT OFFICE 2,168,853

MACHINE FOR CUTTING TUBING

Nelson D. Abbey, Toledo, Ohio

Application November 14, 1936, Serial No. 110,880
Renewed January 11, 1939

18 Claims. (Cl. 164—60)

This invention relates to tubing cutters, and an object is to produce a new and improved cutter which is efficient and economical in operation and is particularly adapted for cutting a long pipe or a continuous tubing into sections of equal length as it is fed from the tubing mill.

Further objects will hereinafter appear, and, for purposes of illustration but not of limitation, an embodiment of the invention is shown on the accompanying drawings, in which—

Fig. 1 is a top plan view of a tubing cutter embodying the invention;

Fig. 2 is a side elevation of the machine shown in Fig. 1;

Fig. 3 is an enlarged vertically sectional elevation of the cutter operating mechanism substantially on the line 3—3 of Fig. 1, showing the parts connected for cutting operation;

Fig. 6 is a diagrammatical view showing the electrical connections and associated parts for operating the machine, and Fig. 7 is a detailed sectional view of a portion of one of the cutter or tool holders showing the brushes carried thereby and the manner in which they contact adjacent parts to form an electrical connection.

Figure 4:
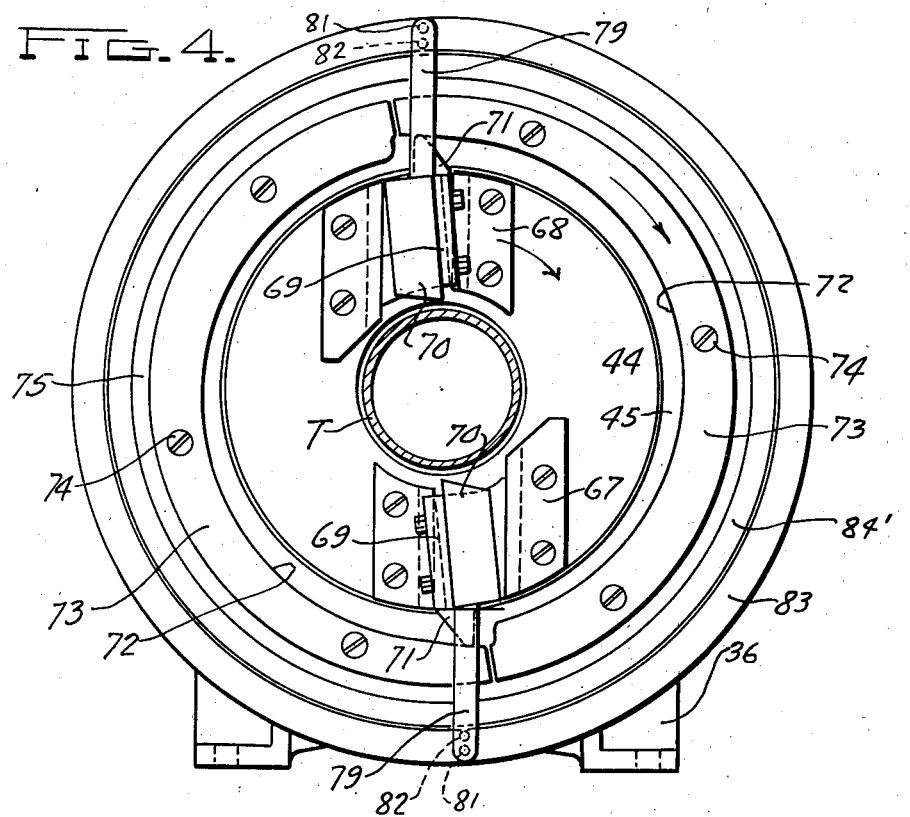
Fig. 4 is a sectional view on the line 4—4 of Fig. 3, showing the cutting instruments.
Figure 5:
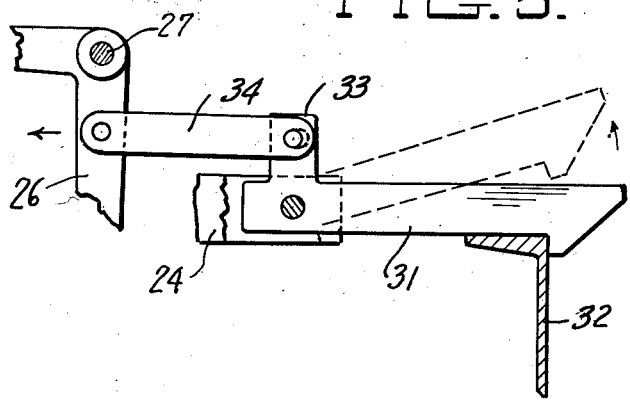
Fig. 5 is a detailed sectional elevation of the latch for holding the carriage in its rearward or normal position.

This invention comprises generally a tubing cutter which may be positioned in juxtaposed position relative to a tubing mill to receive the pipe or tube therefrom and cut the same into suitable lengths. As the tubing advances from the mill, it is clamped by jaws mounted on a carriage which then advances with the tubing. During such advancing movement, the cutting mechanism operates to sever the tubing and as soon as the cut is complete, the clamping jaws are automatically released, the cutting instruments rendered inoperative and the carriage is returned to its normal position, whereupon the operation is repeated. The outer end of the tubing engages a trip or switch which renders operative the mechanism and thereafter the operation is entirely automatic so that as soon as the tubing has been cut, the mechanism is rendered inoperative. Thus, the machine is a self-contained one, requiring merely the actuation of the switch to start it operating, the remaining control mechanism operating independently of cams or other coacting devices on the base or frame.

Referring to the drawings, a carriage C has rollers 10 which ride along tracks 11 on a base or frame 12 which is suitably supported by legs 13. The tubing T from the tube mill (not shown), first passes through a clamp 14 and thence through the cutting mechanism, generally indicated at 15. The front end of the tubing T engages an upright member 16 which is secured to a mercury switch 17, so that upon tilting the switch 17, the clamp 14 is operated to clamp the tubing T, and at the same time, the cutting mechanism 15 is started into operation.

It will be seen that the switch 17 is mounted on a bar 18 supported by vertically adjustable legs 19. By moving the switch 17 one way or the other, the length of the severed tube can be varied as desired. An inclined track 20 guides the front end of the tubing T into engagement with the upright switch member 16.

The clamp 14 has an upper jaw 21 and a lower jaw 22. The upper jaw is supported by a bracket 23 secured to a platform 24 of the carriage and the jaw 22 is movable vertically into and out of engagement with the tubing T by a rod 25, the lower end of which is pivoted to a bell crank lever 26. The lever 26 is pivoted at 27 to the bracket 23 and at its lower end is pivoted to a rod 28, the opposite end of which is connected a piston 29 disposed in an air cylinder 30. It will be apparent that by movement of the rod 28 to the right of Fig. 3, the clamping jaw 22 will be moved downwardly away from the tubing T and movement of the rod 28 in the opposite direction or to the left of Fig. 3, the clamping jaw 22 will be moved upwardly into clamping engagement with the tubing T. As soon as the clamping jaws 21 and 22 have been brought into clamping engagement with the tubing T, the carriage C will travel forwardly with the tubing.

To militate against accidental or unwarranted movement of the carriage C, it is held in its normal or rearward position by a latch 31 which is adapted to hook over a transverse bar 32 secured to the bed or frame 12. The latch 31 is pivoted at its opposite end to the platform 24 and has an upward extension 33 which is connected by a link 34 to the bell crank 26. Consequently, it will be manifest that when the clamping jaw 22 is moved upwardly into clamping relation with the tubing T, the latch 31 will thereupon be lifted out of engagement with the cross bar 32 to enable the carriage to advance or travel with the tubing.

The cutting mechanism which has been generally indicated by the reference numeral 15 comprises longitudinally spaced upright end frames 35 and 36, which are secured to the platform 24.

Extending axially of these end frames is an elongate inner or tool supporting sleeve 37 which is supported in the end frame 35 by ball bearings 38. A ring 39 is in threaded engagement with the forward end of the sleeve 37 and closes the front end of the end frame 35. Spaced from the inner or tool supporting sleeve 37 and mounted on bushings 40 and 41 is an elongate cam supporting sleeve 42. The bushing 40 has a flange 43 at its rearward end which is disposed between the tool supporting head or flange 44 which is integral with the inner sleeve 37 and a head 45 which is integral with the cam supporting sleeve 42.

The bushing 41 has a flange 45' which is disposed between the forward end of the cam sleeve 42 and a hub 46 of a gear 47. The gear 47 is secured by a key 48 to the inner or tool supporting sleeve 37. Secured by bolts 49 to the gear 47 is a ring 50 having rearwardly extending clutch teeth 51 which are adapted to be engaged by teeth 52 of a longitudinally slidable clutch sleeve 53. The clutch sleeve 53 is mounted on the outer side of the cam sleeve 42 and is secured thereto by a key 54, the clutch sleeve being longitudinally grooved to enable it to slide longitudinally relatively to the key 54.

Interposed between the cam sleeve 42 and the end frame 36 is a ball bearing 55. Integral with the end frame 36 and extending forwardly from the ball bearing 55 is a lateral extension 56 enclosing a portion of the clutch sleeve 53. The forward end of the end frame extension 56 abuts against the ring 57 which has clutch teeth 58 which are shown in Fig. 3 meshing with forwardly extending teeth on the clutch sleeve 53. The ring 57 is secured by bolts 59 to a laterally extending flange 60 of a gear 61 which is disposed at one side of the gear 47. Interposed between the gear 61 and the gear ring 50 is a bushing 62.

The gear 47 is connected through an idler gear 63 to a pinion 64 which is continuously driven by an electric motor 65. The gear 61 is connected through the idler gear 66 to the pinion 64. The gear 47 has in this instance one less tooth than the gear 61 for a purpose which will hereinafter appear. It will be understood that both gears 61 and 47 are continuously driven by the electric motor 65 and when the clutch sleeve 53 is moved to the left of Fig. 3 to engage the teeth 51 connected to the gear 47, both the tool carrying sleeve 37 and the cam sleeve 42 are driven at the same rate of speed. At that time, the gear 61 merely idles and performs no useful work. When the clutch sleeve 53 is moved to the right of Fig. 3 to engage the clutch teeth 58 which as above described are secured to the gear 61, then the cam sleeve 42 will be driven at a slightly different rate of speed than the tool sleeve 37 to enable the cam sleeve slowly to creep ahead or move slightly faster than the tool sleeve 37.

Formed on the face of the flange 44 or tool carrying head are two pairs of opposed guides, lower guides 67 and upper guides 68. Between each pair of guides is a tool carrier 69 which is adapted to move radially of the head 44. Clamped to each carrier 69 is a cutting tool 70. Forming a part of each tool holder is a cam element 71 which engages a cam surface 72 of a semi-circular plate 73 secured by screws 74 to a cam holder 75 which in turn is held thereby to the face of the flange 45. There are two plates, one for each tool holder, and together these plates form a substantially continuous ring. It will be observed that each cam surface 72 in a clock-wise direction (Fig. 4) gradually decreases radially so that as the tool holder rotates in a clock-wise direction, the cutting tools 70 are gradually forced radially inward into cutting relation with respect to the tubing T thereby to effect the cutting operation.

Projecting laterally from the outer portion of each tool holder 69 is a projection 76 and interposed between each projection 76 and an extension 77 of the tool carrying sleeve is a coil spring 78 which urges the respective cam member 71 against its cam surface 72. It will be apparent from an inspection of Fig. 4 that when the tool carrying sleeve 37 and the cam sleeve 42 have moved relative to each other through an arc of approximately 180°, the cam members 71 are thereupon moved away from cutting relation with the tubing T because of the increased radius of the cam surface 72 at one end of each plate 73.

It will be understood that the differential rotation or the difference in the rate of speed between the cam sleeve 42 and the tool carrying sleeve 37 enables the cam sleeve to move slightly ahead of the tool carrying sleeve and thereby cam the cutting tool 70 into cutting relation with the tubing T. As above pointed out, this differential movement takes place when the clutch sleeve is in the position shown in Fig. 3 so that the tool carrying sleeve 37 is driven by the gear 47 and the cam sleeve 42 is driven by the gear 61.

Means are provided to release the clamp 14 from the tubing T and at the same time render the cutting mechanism inoperative as soon as the cut has been completed. For this purpose an arm 79 extends outwardly in a radial direction from each tool holder 69. On the outer end of each arm 79 is an extension 80 which is socketed to receive a pair of vertically spaced spring pressed contact brushes 81 and 82. In normal position the brushes 81 and 82 engage a conductor ring 83 which is secured by bolts 84 to the end frame 36. As the tool holder is cammed inwardly to perform the cutting operation, the brush 82 first slips off the ring 83 and is brought into contact with a conductor ring 84'. When both the brushes 81 and 82 engage the conductor ring 84', as will herein appear, the cutting mechanism is rendered inoperative because the clutch sleeve 53 is shifted out of the position shown in Fig. 3, into engagement with the clutch teeth 51. This causes the cam sleeve 42 and tool carrying sleeve 37 to rotate together at the same rate of speed. At the same time the cutting mechanism is rendered inoperative the clamp 14 is released and the carriage is returned to normal position.

Actuation of the clutch sleeve 53 is effected by an arm 85 which is pivoted at 86 to the end frame 36 and has a yoke 87 provided with rollers 88 on the ends thereof which engage in opposite sides of a clutch collar 89. The rod 28 extends through the opposite end of the arm 85 and disposed on opposite sides of the arm are coil springs 90 and 91 bearing respectively at their outer ends against a collar 92 and a washer 93. It will be apparent that movement of the piston 29 in one direction or the other concomitantly actuates the clutch arm 85 and the clamping jaw 22 as well as the latch 31 which is linked to the bell crank 26.

After the tubing T has been severed as above indicated, the clamp 14 is released to enable the carriage C to be returned to its normal position.

In this instance, the return movement is accomplished by a counterweight arrangement. As shown, a cable 94 is secured at one end to the carriage C, extends rearwardly about a sheave 95 and thence forwardly to the peripheral portion of a relatively large wheel 96, where it is secured. Connected for rotation with the relatively large wheel 96 is a relatively small wheel 97 to which one end of a cable 98 is secured. The cable 98 extends upwardly over a sheave 99 and thence downwardly to weights 100. Obviously, this arrangement of wheels and sheaves is to economize on space. It will be seen that when the carriage C returns to normal position, the latch 31 again engages the cross bar 32 to hold the carriage in that position. A spring cushion bumper 101 is provided to cushion the impact of the carriage on its return movement, and when the latch 31 is in engagement with the cross bar, the spring bumper 101 is under compression in order to give the carriage a starting impetus when the latch is released.

Referring to the diagram shown on Fig. 6, it will be apparent that the tubing T upon engagement with the upright member 16 will tilt the mercury switch 17 to connect leads $a$ and $b$. The opposite end of the lead $a$ is connected to a coil 102 and passes through a step-down transformer 103 from which current is supplied from higher voltage leads $c$ and $d$. The lead $b$ connects to a starting switch 104 which engages the underside of the carriage C near the rear end thereof so that when the carriage is in its rearward or normal position, the switch is in position to form a connection between the leads $b$ and $b'$. After the carriage C has traveled a short distance along the bed 12, it passes over the switch 104 which then snaps automatically to inoperative position. The opposite end of the lead $b'$ is connected to the opposite end of the coil 102. Actuated by the coil 102 is an armature 105 which is normally held in its lowermost position by coil springs 106 so that the left-hand portion engages a contact 107. When in its raised position, another portion of the armature 105 engages a contact 108. The contacts 107 and 108 are connected by a lead $e$ which is connected to the main power lead $d$. The left side of the armature 105 is connected by a lead $f$ to a solenoid $g$. The right side of the armature 105 is connected by a lead $h$ to a solenoid $j$ which is in opposed relation to the solenoid $g$. From the solenoids $g$ and $j$ extends a lead $k$ to the main power lead $c$. A core $l$ is common to the solenoids $g$ and $j$ and pivotally connected to the core $l$ is an arm 109 which is connected to an air valve within a housing 110. A source of air pressure supply is connected to a pipe 111 which connects to the valve housing 110 from which branches 112 and 113 lead to opposite ends of the air cylinder 30. It will be apparent that by energizing the solenoid coil $g$, the arm 109 will be swung to the right of Fig. 6 and by energizing the coil $j$, the arm 109 will be rocked to the left of the figure, thereby to admit fluid, such as air under pressure to the cylinder 30 for driving the piston 29 in one direction or the other.

In operation, after the mercury switch 17 is tilted to form a connection between the leads $a$ and $b$, current passes from the main supply lead $c$ through the lead $a$ from the transformer 103, the switch 17, the lead $b$, the starting switch 104, the lead $b'$ to the coil 102 and thence through the lead $a'$ to the main power lead $d$ through the transformer 103, thus completing the circuit. By energizing the coil 102, the armature 105 moves upwardly into engagement with the contact 108 thereby causing current to flow from the main power lead $d$ through the lead $e$, through the left-hand portion of the armature 105, through the lead $f$ to the coil $g$ and thence through the lead $k$ to the power lead $c$. The core $l$ is thereby driven to the right of Fig. 6 opening the passage 112 to the air line 111 and thereby driving the piston 29 to the right of the cylinder 30. This simultaneously swings the clutch lever 85 to move the clutch 53 into engagement with the gear 61, actuate the clamping jaw 22 upwardly into clamping relation with the jaw 21 to clamp the tubing and also to release the latch 31.

Since the tubing is now clamped to the carriage C, the latter moves along with the tubing and after the carriage has moved a short distance, the starting switch 104 is released. Such movement of the carriage is sufficient to enable the arms 79 connected to the tool holder 69 to have been moved to the position shown in Fig. 7 in which the brushes 81 and 82 engage respectively the conductor rings 83 and 84'. Thereupon the current passes through a lead $m$ which branches from the lead $b$ and is connected to the conductor ring 83. The current then passes through the conductor ring 84' which is connected by a lead $n$ to the lead $b'$.

It is thus apparent that the tubing T remains clamped and the cutting of the tubing continues until the brushes 81 and 82 have both moved into engagement with the conductor ring 84', thereby breaking the circuit and de-energizing the coil 102. This enables the coil springs 106 to move the armature 105 downwardly away from the contact 108 and into engagement with the contact 107. Thereupon, the current flows from the lead $e$ through the right-hand side of the armature 105 through the lead $h$ to the coil $j$ and from the coil $j$ to the main power lead $c$ through the lead $h$ and transformer 103. Excitation of the coil $j$ moves the core $l$ to the left of Fig. 6 thereby moving the valve in the housing 110 to admit air under pressure to the right-hand side of the cylinder 30 for driving the piston 29 to the left of the figure. This operates to move the clamping jaw 22 away from the jaw 21 and to move the clutch sleeve 53 to the right and into engagement with the gear 47, whereupon the cam sleeve 42 and tool carrying sleeve 37 resume rotation at the same rate of speed.

Since the tubing T is now released from the clamp 14, the carriage C is moved rearwardly by means of the counterweight arrangement above described and the latch 31 again moves into engagement with the cross bar 32. It will be understood that the motor 65 which drives the cutting mechanism is driven from a separate power line and operates continuously. A limit switch 114 may be mounted on the base 12 in the path of movement of the carriage C so that if the carriage should advance beyond a predetermined point, the switch 114 is actuated to stop the operation of the tubing mill generally indicated at 115, and to which the switch 114 is connected by leads $o$ and $o'$.

It is to be understood that numerous changes in details of construction, arrangement and operation may be effected without departing from the spirit of the invention especially as defined in the appended claims. It should be understood that the cutting mechanism above described can be used to advantage independently of the remaining parts to cut tubing cleanly and without any jagged edges.

What I claim as new is:

1. In a machine for cutting measured lengths from a continuously moving tube, a base, a carriage movable back and forth on said base, means to clamp the tubing to the carriage, means on the carriage to cut the tubing, means operable independently of movement of the carriage for operating said clamping means and also said cutting means, and means controlled by said cutting means for releasing said clamping means after a predetermined cut has been made.

2. In a machine of the class described, in combination, a base, a carriage movably mounted on said base, releasable clamping means mounted upon said carriage cutting mechanism supported by the carriage, means for rendering operative the clamp and cutting mechanism, and means controlled by said cutting mechanism for rendering both the clamping means and cutting mechanism inoperative.

3. In a machine for cutting measured lengths from a continuously moving tube, a base, a carriage movable back and forth on said base, releasable clamping means mounted upon said carriage, means on the carriage to cut the tubing, a member engageable by the outer end of the tubing, operative means rendered effective upon actuation of said member for actuating said clamping means and cutting means, and means operable independently of carriage movement for releasing said clamping means and rendering ineffective said cutting means.

4. In a machine for cutting measured lengths from a continuously moving tube, a base, a carriage movable back and forth on said base, releasable tube clamping means mounted upon said carriage, means on the carriage to cut the tubing, a member engageable by the tubing for rendering operative said clamping and cutting means, said cutting means being constructed and arranged to continue the cutting operation independently of carriage movement, and means controlled by actuation of said cutting means for causing release of said clamping means and rendering said cutting means inoperative.

5. In a machine for cutting measured lengths from a continuously moving tube, a base, a carriage movable back and forth on said base, releasable tube clamping means mounted upon said carriage, means on the carriage to cut the tubing, a member engageable by the tubing for rendering operative said clamping and cutting means, said cutting means being constructed and arranged to continue the cutting operation independently of carriage movement, and means controlled by the position of the cutting instrument for causing said clamping means to be released.

6. In a machine for cutting measured lengths from a continuously moving tube, a base, a carriage movable back and forth on said base, releasable tube clamping means mounted upon said carriage, means on the carriage to cut the tubing, means engageable by the tubing for concomitantly rendering said cutting and clamping means operative, said cutting means being automatically rendered inoperative upon completion of the cutting, means controlled by the movement of the cutting means for releasing said clamping means, and means to return the carriage to normal position upon release of the clamping means.

7. In a machine for cutting measured lengths from a continuously moving tube, a base, a carriage movable back and forth on said base, releasable clamping means mounted upon said carriage, a cutting instrument movable radially with respect to the tubing and revoluble thereabout, means for actuating said cutting instrument, conjoint means rendered effective by movement of the tubing to actuate said clamping means to engage the tubing and for operating said cutter actuating means, and means controlled by the movement of said cutting instrument for releasing said clamping means and rendering ineffective said cutter actuating means.

8. In a machine for the class described, in combination, a base, a carriage movably mounted on said base, a rotatable cutter head on said carriage having an independently movable cutting instrument, a cam juxtaposed to said cutter head and normally rotatable at the same rate of speed as said head, means to impart differential rotation to said cam and head to cause the cam to actuate the cutting instrument on said head into cutting relation with the tubing, and means operable upon a predetermined movement of the cutting instrument for causing the cutter head and cam to rotate thereafter at the same rate of speed.

9. In a machine for cutting measured lengths from a continuously moving tube, a base, a carriage movable back and forth on said base, releasable clamping means mounted upon said carriage for clamping the tubing thereto, means on the carriage to cut the tubing, said cutting means comprising a rotatable cutter head having an independently movable cutting instrument and a cam normally rotatable with said head at the same rate of speed, means to impart differential rotation to said cam and head to cause the cam to actuate the cutting instrument into cutting relation with the tubing, means actuated by the tubing for actuating said clamping means and imparting said differential movement, and means responsive to movement of said cutting instrument for causing release of said clamping means and causing said cam and cutter head to resume rotation at the same rate of speed.

10. In a machine of the class described, a base, a carriage movable back and forth on said base, a clamp upon said carriage, a cutter upon said carriage, means for operating said clamp and at the same time rendering said cutter operative, and means responsive to the operation of said cutter for releasing said clamp and rendering said cutter inoperative.

11. In a machine of the class described, a base, a carriage movable back and forth on said base, a clamp upon said carriage, a cutter upon said carriage, means to hold said carriage in normal position, means for operating said clamp and at the same time rendering said cutter operative, said operating means also effecting release of said holding means, and means responsive to the operation of said cutter for releasing said clamp and rendering said cutter inoperative.

12. In a tubing cutter, a base, a carriage movable back and forth on said base, a clamp upon said carriage, a cutter upon said carriage, means on the carriage for clamping the tubing, means on the carriage to cut the tubing, means for operating said clamping and cutting means in timed relation, and electrical means responsive to the movement of said cutting means substantially upon completion of the cut to effect release of said clamping means and render inoperative said cutting means.

13. In a tubing cutter, a base, a carriage movable back and forth on said base, a clamp upon said carriage, a cutter upon said carriage, means on the carriage for clamping the tubing, means on the carriage to cut the tubing, pneumatic means operatively conjoined to said clamping means and cutting means, electrical means for rendering said pneumatic means effective upon engagement by the tubing, and means responsive to said cutting means for actuating said pneumatic means to cause said cutting means and clamping means to be rendered inoperative.

14. In a machine for cutting measured lengths from a continuously moving tube, a base, a carriage movably mounted on said base, a rotatable cutter head on said carriage having a radially movable cutting instrument, a cam juxtaposed to said head, engageable with said cutting instrument, and normally rotatable at the same rate of speed as said head, means for driving said head and cam at different rates of speed to cause said cam to force said cutting instrument into cutting relation to the tube, said driving means including a pneumatically actuated clutch, electrical means including a part engageable by said tubing for operating the pneumatic means to actuate the clutch, and means for automatically rendering the cutting means inoperative upon completion of the cut.

15. In a tubing cutter, a rotatable cutter head having a plurality of radially movable cutters, a cam juxtaposed to said head and engageable with said cutters for imparting radial movement thereto upon movement of said cam relatively to said head, means to drive said head and cam normally at the same rate of speed, means to cause one of said head and cam members to rotate at a different rate of speed than the other member, and means responsive to the radial movement of said cutters for causing said head and cam members to resume rotation at the same rate of speed.

16. In a tubing cutter, a clamp, a cutter, means for operating said clamp and at the same time rendering said cutter operative, and means responsive to operation of said cutter for releasing said clamp and rendering said cutter inoperative.

17. In a tubing cutter, a clamp for engaging the tubing, a rotary cutter head having a cutter, a rotary cam for imparting advancing movement to the cutter upon rotation of the head and cam at different rates of speed, means for operating said clamp and at the same time causing rotation of said head and cutter at different rates of speed, and means controlled by the position of said cutter for releasing said clamp and causing said head and cutter to resume rotation at the same rate of speed.

18. In a cutter for longitudinally moving tubing, a base, a carriage movable back and forth on said base, means on the carriage for clamping the tubing, means on the carriage for cutting the tubing, fluid means operatively conjoined to said clamping means and cutting means, electrical means for rendering said fluid means effective in response to movement of the tubing, means responsive to said cutting means for actuating said fluid means to cause said cutting means and clamping means to be rendered inoperative, and means for returning the carriage to its original position.

NELSON D. ABBEY.